UNITED STATES PATENT OFFICE.

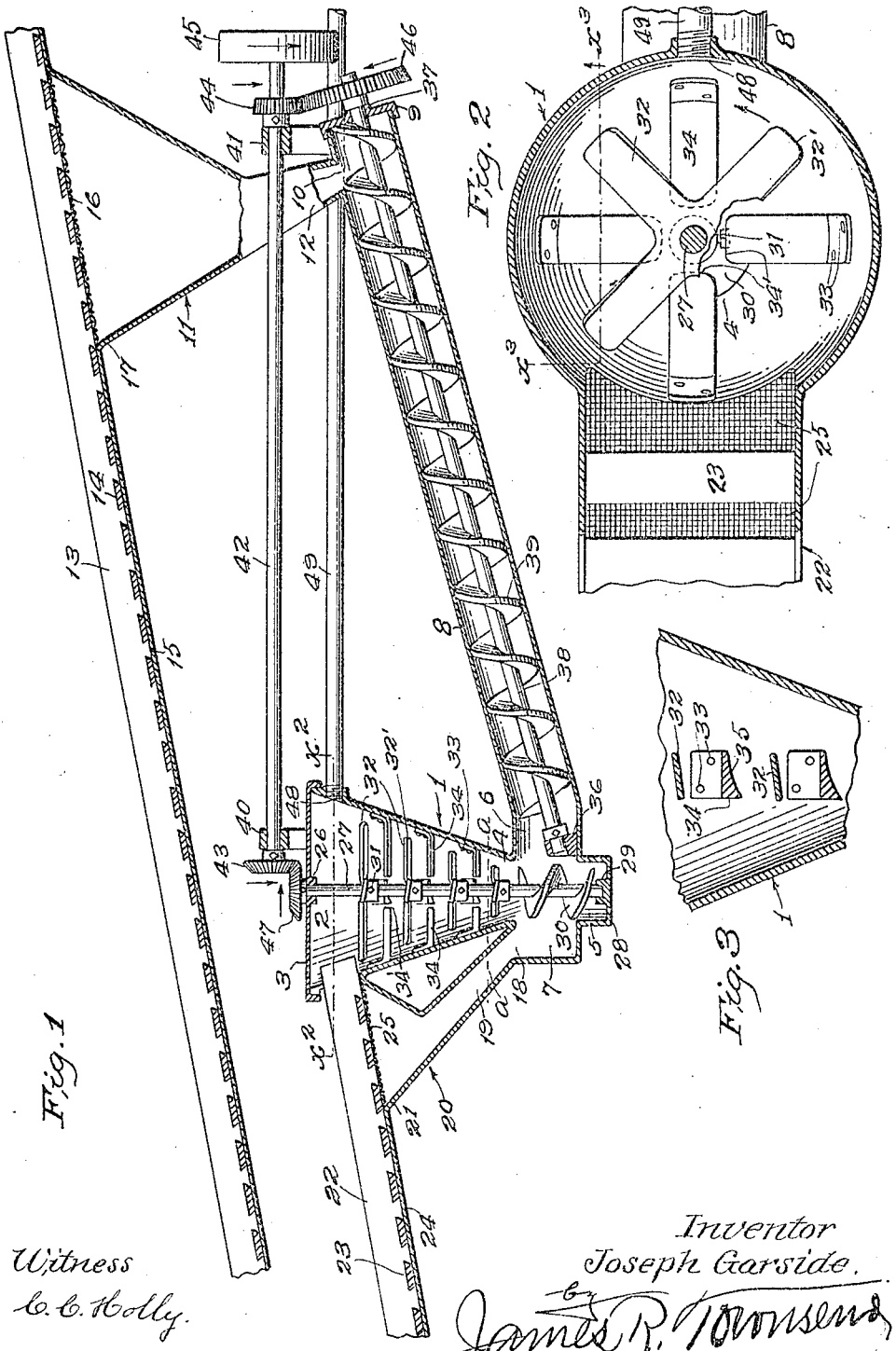

JOSEPH GARSIDE, OF BRAWLEY, CALIFORNIA.

ROTARY AMALGAMATOR.

1,292,753.  Specification of Letters Patent.  Patented Jan. 28, 1919.

Application filed May 7, 1917. Serial No. 167,135.

*To all whom it may concern:*

Be it known that I, JOSEPH GARSIDE, a citizen of the United States, residing at Brawley, in the county of Imperial and State of California, have invented a new and useful Rotary Amalgamator, of which the following is a specification.

My invention relates to devices in which particles of precious metals by combination with mercury are recovered from materials with which they may be mixed, and the non-amalgamable material is carried away from the amalgam so formed by the action of water.

In amalgamating devices heretofore constructed the large grains of the precious metals have been successfully collected and retained in the amalgam, while some of the fine particles of the metals have been allowed to escape with the waste or the non-amalgamable material.

The main object of the present invention is to recover the fine particles of the precious metals from silt, fine sand, or the like, containing such metals, in an effective manner and at a minimum expense, while the coarse gold, if any, is recovered without amalgamation.

I accomplish these objects by a device in which the material containing the precious metal is washed down a sluice box, and the fine particles are separated from the coarse particles of the material by means of a screen and then carried into a hopper or receiving vessel wherefrom by suitable mechanism they are fed into a mixing chamber containing mercury. In this mixing chamber the material is thoroughly agitated by a rotating mixer so as to bring a maximum of the precious metal into contact with the mercury, whereafter the non-amalgamable material is carried out of the mixing chamber into a second sluice box by means of a gentle stream of water led into the mixing chamber. The second sluice box is also provided with means for returning to the mixing chamber such parts of the mercury as may have escaped with the non-amalgamable material into the sluice box so that the mercury may be used repeatedly until fully combined with the precious metal, and the operation of the device by such means is made very economical.

Further objects and advantages of the invention may appear from the accompanying drawings, the subjoined specification and appended claims.

The accompanying drawings illustrate the invention.

Figure 1 is a sectional elevation of the device.

Fig. 2 is an enlarged sectional plan view taken on line $x^2$, in Fig. 1, one of the blades in a set of blades being broken away, and another blade being partly broken in order to show the projection or tooth underneath.

Fig. 3 is a broken sectional elevation of the mixing chamber taken on line $x^3$, Fig. 2, with the mixer blades in the position shown in Fig. 1, and illustrates the inclination of the blades and the projections on the inside of the mixing chamber, and also the concavity of the undersides of the projections.

My amalgamator comprises a mixing chamber 1 which is preferably frusto-conical in shape and placed in a substantially vertical position, with its wide end 2 turned upwardly and preferably closed by a cover 3 secured thereto by any suitable means. The mixing chamber 1 is adapted to have mercury therein and has at its lower narrow end 4 a downward extension forming an extension chamber 5, which is provided with two inlet chambers 6 and 7 preferably located opposite to each other.

An inclined conduit 8 having its lower end connected with the inlet 6 is closed at its upper end by a suitably attached closure 9 and is provided near its upper end with an opening 10. Above the conduit 8 is a hopper or receiving vessel 11, which leads with its lower, narrow end 12 to the opening 10, and the sluice-box 13—having ordinary transverse riffles 14 in the bottom 15 thereof, and being otherwise of a construction adapting it for receiving therein and feeding downward material, such as sand, gravel, silt, or the like, containing precious metal—runs at some part of its course over the hopper 11, and at this part has its bottom open and has a screen 16 suitably fastened to the sluice box and covering the entire wide upper end 17, the screen 16 thus affording a means for preventing coarse particles of the material containing the precious metal from entering the hopper.

It is understood that water is conveyed from a water source to the sluice box 13 for washing the material down the sluice box, and that mercury may be provided between the riffles 14 for separating the precious metal contained in the material from the non-amalgamable parts. But these expedients in connection with the sluice box are well known in the art and are therefore not shown in the drawings or claimed in this application.

The inlet chamber 7 at the side of the extension chamber 5 has preferably an upward opening 18 connected with the lower, narrow end 19 of the funnel 20 opening with its wide end 21 under a sluice box 22 which is preferably lower than the sluice box 13 and likewise provided with riffles 23 in its bottom 24. This sluice box 22 has also at that part where it passes over the funnel 20 its bottom 24 open and a screen 25 covering the entire wide end 21 of the funnel 20 is suitably fastened to the sluice box for a purpose that will be explained hereinafter.

The mixing chamber 1 and the extension chamber 5 are supplied with mercury up to a level above that which is indicated by the line $a$ and may represent a height above the bottom of the extension chamber 5 of six inches, more or less, according to the size and height of the mixing chamber and the extension chamber, the height of the inclined conduit 8 and hopper 11, and also the height at which the sluice box 22 is connected with the upper part of the mixing chamber 1.

The cover 3 of the mixing chamber 1 has centrally an upper bearing 26 for rotatively holding therein a mixer shaft 27, which runs longitudinally through the mixing chamber and through the extension chamber 5 to the bottom 28 thereof and is rotatively supported at its lower end in a bearing 29 centrally fixed in the bottom 28. The mixer shaft 27 has integral therewith upon its periphery a feed screw 30 consisting of a helical blade and extending along the shaft 27 throughout the length of the extension chamber 5. In the mixing chamber 1 the mixer shaft 27 has secured thereto in any desirable manner, for instance, by set-screws 31 a number of blades or vanes 32 reaching with their tips 32' to the same distance from the side wall of the mixing chamber 1. These blades 32 are preferably arranged in sets longitudinally upon the mixer shaft, the blades in each set being of virtually the same length and shape and at right angles to the shaft, but the blades in the different sets differing in length and being so arranged with respect to one another that the set comprising the shortest blades is nearest to the lower, narrow end 4 of the frusto-conical chamber 1, and the other sets of blades are fixed to the shaft at intervals according to the length of the blades successively from the shortest blades to the set comprising the longest blades, which set is nearest to the upper end 2 of the mixing chamber 1.

Attached by rivets 33 or by any other suitable means to the inside of the frusto-conical mixing chamber are projections or teeth 34 preferably arranged in sets between the sets of blades 32 on the mixer shaft 27 and reaching with their tips 34' to the same distance from the mixer shaft. Like the blades 32 the projections 34 of each set are of the same length and shape, and at right angles to the mixer shaft. The length of the projections in the different sets varies, however, according to their location in the frusto-conical chamber 1; that is, the set comprising the shortest projections is arranged between the set comprising the shortest blades and the set comprising the blades next shortest, and so on successively to the set comprising the longest projections which set is arranged between the set comprising the longest blades and the set comprising the next longest. In this instance, or as in Fig. 1, there are shown only three sets of projections 34 and four sets of blades 32, each set comprising four members, but it is understood that any other number of blades and projections and any other arrangement thereof may be applicable for the purpose of this invention.

I prefer to incline the blades slightly in the same direction as the spiral inclination of the feed screw 30, in order to assist the feed screw in feeding the material containing precious metal upwardly in the mixing chamber 1, and I also prefer, for a purpose hereinafter explained, to incline the undersides of the projections 34 in a similar manner and to provide these undersides with concave faces 35.

The inlet chamber 6 has secured to its bottom a bearing box 36, and centrally in the closure 9 of the conduit 8 is a bearing 37, the bearings 36 and 37 being in alinement with each other and adapted to hold relatively therein a shaft 38. Integral with the shaft 38 and upon the periphery of the shaft is a feed screw 39 consisting of a helical blade and extending throughout the length of the conduit 8, the height of the blade being uniform throughout and sufficient for fitting the screw 39 snugly but rotatably within the conduit.

On the top of cover 3 is a bearing 40, and suitably secured at the upper end of the conduit 8 is another bearing 41 in alinement with the bearing 40. Rotatably held within the bearings 40 and 41 is a shaft 42 which has secured thereto at its end above the mixing chamber 1 and outside of the bearing 40 a bevel gear wheel 43 and at its other end outside of the bearing 41 another bevel gear wheel 44. A pulley 45 is also secured to the shaft 42 outside of the gear wheel 44 for the purpose of transmitting rotary motion to the shaft from a suitable source of power.

The rotatable shaft 38 in the conduit 8 has secured thereto outside of the closure 9 a gear wheel 46, meshing with the bevel gear wheel 44 on the shaft 42, and the mixer shaft 27 has secured thereto above the cover 3 a bevel gear wheel 47, meshing with the bevel gear wheel 43 on the shaft 42, so that rotary motion is simultaneously transmitted to the mixer shaft 27 and the shaft 38 when the shaft 42 is rotated.

The arrow upon the pulley 45 indicates the rotary direction of the shaft 42, the rotary direction imparted to the mixer shaft 27 from the shaft 42 being indicated by arrows in Figs. 1 and 2, and the rotary direction of the shaft 38 being indicated in Fig. 1 by the arrow outside of the gear wheel 46.

The feed screw 39 in the conduit 8 and the feed screw 30 in the extension chamber 5 are both shown as left-handed screws. It is understood, however, that right-handed screws are equally serviceable, the direction of the different shafts and the inclination of the blades 32 and the concave undersides 35 of the projections 34, in such an instance being the reverse of what is shown in the drawings.

I also provide the upper part of the mixing chamber 1 with an inlet 48 to which a pipe 49 leads from a water source, and it is understood that by means of a gentle flow of water through the pipe 49 the non-amalgamable material in the mixing chamber will be washed out of the mixing chamber and carried away through the lower sluice box 22.

When the amalgamator is at rest, mercury is as stated, supplied thereto until it reaches the level line indicated at $a$. The device is then ready for operation which is as follows:

The shaft 42 rotating and thus transmitting simultaneous rotary motion to the mixer shaft 27 and the shaft 38, the material containing precious metals is washed down the upper sluice box 13. The coarse particles thereof then continue their downward course, while the fine particles pass through the screen 14 into the hopper 11 and are led therefrom to the upper end of the inclined conduit 8. The feed screw 39 therein, revolving at such a uniform rate of speed as has been found most suitable for the purpose, then feeds the material into the extension chamber 5, and the feed screw 30 upon the mixer shaft 27, preferably rotating at a higher rate of speed than the feed screw 39, thereafter assists in feeding and lifting the material through the mercury in the expansion chamber 5 and the mixing chamber 1, and thereby at all times prevents clogging of the amalgamator. During this operation, however, rotation of the mercury in the mixing chamber is measurably prevented by the inclined, concave underside faces 35 of the teeth or projections 34 on the inside of the frusto-conical mixing chamber 1, it being seen that the inclination of the concavities of the projections 34 is opposed to the rotary movement so that the projections therefore tend to restrain the mercury.

Since the sets of blades 32 are successively arranged one above the other, from the set comprising the shortest blades to that comprising the longest, the peripheral speed of the blades during the rotation of the mixer shaft also successively increases upwardly so that the material, as it is fed upwardly and contacts with the side of the mixing chamber, is agitated in increased ratio to its distance from and above the ordinary mercury level $a$. The peripheral speed of the uppermost blades being greater than the peripheral speed of the lower sets of blades, the agitating process of such material as in its upward travel through the mixing chamber may have been only partially agitated by the lower blades is thus effectively finished by the uppermost set of blades.

In this manner a thorough mixing of the material with the mercury by means of the rotating blades 32 is effected and a maximum of the precious metal contained in the material comes in contact with the mercury and thus forms an amalgam therewith. At the upper part of the mixing chamber 1 the gentle flow of water through the inlet 48 from the pipe 49 washes the non-amalgamable material above the mixer blades 32 into the sluice box 22 through which it is thereafter carried to any suitable place.

Should mercury escape with the material into the sluice box 22, the mercury on account of its great gravity drops down through the screen 25 into the funnel 20 and is thus returned to the extension chamber 5, so that the charge of mercury is conserved during the operation of the amalgamator, and an economical result is obtained.

It is seen from the foregoing that the feed screws 39 and 30 feed the material continuously into the mixing chamber 1 independently of the rate of speed at which the material is washed down the upper sluice box 13, as, even if the material should drop down into the hopper 11 faster than the feed screws can feed it to the mixing chamber, it would simply fill the hopper, and the fine material that could not find access thereto would be carried with the coarse material down the sluice box 13. However, in order to avoid repeated washing of the same material, it is desirable that the supply of the material to the hopper 11 does not exceed the feeding capacity of the feed screws, the regulation of such supply being well known in the art and therefore left to the skill and judgment of the operator.

I claim:

1. A rotary amalgamator comprising a frusto-conical mixing chamber having its wide end turned upwardly and being at its lower, narrow end provided with a downward extension forming an extension chamber, which together with the lower part of the mixing chamber is adapted to have mercury therein; continuous, rotatable means for feeding into the extension chamber material containing precious metal; a mixer mounted to rotate in the mixing chamber; continuous means connected with the mixer and located in the extension chamber and coöperating with the feeding means to the extension chamber for feeding the material through the mercury and into the mixing chamber so as to prevent clogging of the amalgamator at all times during its operation; means connected with the mixer and located in the mixing chamber for agitating the material at an increased ratio to its distance from and above the ordinary level of the mercury; and means for simultaneously rotating the mixer and the feeding means.

2. A rotary amalgamator comprising a frusto-conical mixing chamber having its wide end turned upwardly and being at its lower, narrow end provided with a downward extension forming an extension chamber, which together with the lower part of the mixing chamber is adapted to have mercury therein; continuous, rotatable means for feeding into the extension chamber material containing precious metal; a rotatable mixer shaft mounted longitudinally in the mixing chamber and the extension chamber and being provided with sets of blades of different lengths and successively arranged one above the other, from the set comprising the shortest blades to that comprising the longest so that the peripheral speed of the blades during the rotation of the mixer shaft is successively increased upwardly; continuous feeding means coöperating with the feeding means to the extension chamber for feeding material through the mercury upwardly and into contact with the blades; and means for simultaneously rotating the mixer shaft and both feeding means.

3. A rotary amalgamator comprising a frusto-conical mixing chamber having its wide end turned upwardly and being provided at its lower, narrow end with a downward extension forming an extension chamber, the extension chamber and the lower part of the mixing chamber being adapted to have mercury therein; continuous rotatable means for feeding material containing precious metal into the extension chamber and through the mercury into the mixing chamber; a rotatable mixer shaft mounted longitudinally in the mixing chamber and in the extension chamber; blades fixed upon the mixer shaft, the blades being arranged in sets, and the blades in each set being of virtually the same length and at right angles to the mixer shaft, but the blades in the different sets differing in length and being so arranged with respect to one another that the set comprising the shortest blades is nearest to the lower, narrow end of the frusto-conical chamber, and the other sets of blades being fixed longitudinally upon the shaft at intervals according to the length of the blades successively from the shortest blades to the set comprising the longest blades, which set is nearest to the upper wide end of the mixing chamber; and means for simultaneously rotating the mixer shaft and the feeding means.

In testimony whereof, I have hereunto set my hand at Brawley, California, this 30th day of April, 1917.

JOSEPH GARSIDE.

Witness:
PHILO JONES.